United States Patent [19]
Moran et al.

[11] Patent Number: 5,784,061
[45] Date of Patent: Jul. 21, 1998

[54] METHOD AND APPARATUS FOR COLLAPSING AND EXPANDING SELECTED REGIONS ON A WORK SPACE OF A COMPUTER CONTROLLED DISPLAY SYSTEM

[75] Inventors: Thomas P. Moran, Palo Alto; Patrick Chiu, Menlo Park; William J. van Melle, Los Altos, all of Calif.

[73] Assignee: Xerox Corporation, Stamford, Conn.

[21] Appl. No.: 670,967

[22] Filed: Jun. 26, 1996

[51] Int. Cl.⁶ .................................................. G06F 3/00
[52] U.S. Cl. .................................... 345/358; 345/173
[58] Field of Search ............................. 395/348, 333, 395/334, 335, 339, 357, 358; 345/358, 173, 179, 180, 181

[56] References Cited

U.S. PATENT DOCUMENTS

| | | | |
|---|---|---|---|
| 5,347,295 | 9/1994 | Auglnick | 345/358 X |
| 5,471,578 | 11/1995 | Moran et al. | 345/358 |
| 5,485,565 | 1/1996 | Saund et al. | 345/442 |
| 5,509,114 | 4/1996 | Moran et al. | 345/443 |
| 5,523,775 | 6/1996 | Capps | 345/179 |
| 5,544,302 | 8/1996 | Nguyen | 345/348 X |
| 5,568,639 | 10/1996 | Wilcox et al. | 345/344 |
| 5,592,608 | 1/1997 | Weber et al. | 345/358 |
| 5,594,810 | 1/1997 | Gourdol | 382/187 |
| 5,619,637 | 4/1997 | Henshaw et al. | 345/348 |
| 5,680,562 | 10/1997 | Conrad et al. | 345/342 |

Primary Examiner—A. Katbab
Attorney, Agent, or Firm—Richard B. Domingo

[57] ABSTRACT

A method and apparatus for representing a group of graphic objects so as to maximize usage of a display area on a computer controlled graphics display system. The present invention provides a means for "collapsing" a group of graphic objects so that the group is represented by a container icon. The container icon occupies a smaller amount of display area than the group of objects. The group is recallable (i.e. expanded) by "tapping" on the container icon. Alternatively, the group may be located on a separate accessible area of the display space. The container icon is itself a graphical object and can be moved, copied or deleted. Any change of attributes, e.g. color, of the graphical object causes a corresponding change to the group of graphic objects.

20 Claims, 18 Drawing Sheets

METHOD AND APPARATUS FOR COLLAPSING AND EXPANDING SELECTED REGIONS ON A WORK SPACE OF A COMPUTER CONTROLLED DISPLAY SYSTEM

CROSS REFERENCE TO RELATED APPLICATIONS

The present application is related to commonly assigned U.S. patent application Ser. No. not yet assigned entitled "Method and Apparatus For Grouping Graphic Objects On A Computer Based System Having A Graphical User Interface" which was filed concurrently with the present application.

1. Field of the Invention

The present invention is related to the field of operating in a graphics based computer system, and in particular to defining collections of displayed graphic objects in said graphics based computer system.

2. Background of the Invention

Computer based systems such as pen based systems and "electronic whiteboards" (e.g. the LiveBoard™ available from LiveWorks a division of Xerox Corporation), provide graphical user interfaces based on utilization of an input device such as a pen, stylus or a cursor control device. In such systems the "display" acts as both a means for showing data and as an input medium. Graphic objects may be "drawn" on the display via pen strokes created using the input device. The graphic objects may represent words, figures or anything that can be displayed. Various operations can then be performed on the graphic objects using an input technique known as gestures. Gestures are themselves merely pen strokes which are interpreted as instructions. Sometimes, such systems will have a draw mode of operation and a gesture mode of operation to distinguish when a pen stroke creates a persistent graphic object or when the pen stroke is treated as a gesture.

When interacting with a computer based system, stopping the thought process in order to wait for operations, e.g. to group or rearrange graphic objects, has a very detrimental effect. Such stoppages generally slow the creative processes. This is of particular impact to the synergy of the group interactions. Artificial delays may cause participants to "lose their train of thought" resulting in the possible loss of ideas. Thus, there is a general need in systems with graphical user interfaces for techniques that provide intuitive and quick manipulation of graphic objects.

Electronic whiteboard such as the LiveBoard are typically used in connection with a collaborative activity such as a meeting. When used, graphic objects representing lists, figures, etc. are drawn. A common operation on such a system is for the user to group graphic objects so that operations can be applied to the objects as a single grouped unit (e.g., moving the objects as a group to retain the spatial orientation amongst the members of the group). Such an operation may be performed by a selection gesture, such as encircling the desired graphic objects and performing a grouping operation. The user may later want to change the group, e.g. ungroup the objects to operate on them individually, add or subtract objects from the group, etc.. In a typical graphical user interface, such a grouping operation would be accomplished by a user selecting the group, applying an Ungroup command, reselecting the desired objects, and then applying the Group command on the desired graphic objects. When performed in a dynamic setting such as a meeting, such steps are awkward. Thus, in such systems there is a need for a technique by which groups of graphic objects can be easily altered.

U.S. Pat. No. 5,471,578 entitled "Apparatus and Method For Altering Enclosure Selections In A Gesture Based Input System", hereinafter the '578 patent, which is assigned to the same assignee of the present application describes a graphical editing system which allows a user to modify a selection gesture without having to redraw the entire gesture. The system defines a selection with an enclosure that is treated as an ephemeral graphic object that can be altered, i.e., reshaped by a set of subsequent gestures which allow the user to expand or reduce the size of the enclosure. These alteration gestures activate specified points or portions of the enclosure to control its shape. If a selection enclosure is drawn, it can be altered to include or exclude additional data by drawing a line segment that is detected by its location relative to the selection enclosure as an alteration gesture to reshape the existing enclosure to include the line segment.

Unfortunately, the invention of the '578 patent cannot be directly used to alter a group of graphic objects once a selection is made. This is because the selection enclosure is an ephemeral graphic object that only exists while a selection is in existence.

Another deficiency with operating with groups is that absent a selection, there is no visual indication that graphic objects are capable of being treated as a group. It would be desirable to provide a non intrusive and intuitive means by which to indicate a grouping of graphic objects.

Thus there is a need for means for interacting with groups of graphic objects that is both visually apparent and that is persistent.

Another desirable capability for such graphical user interfaces is to be able to provide persistent visual links between groups. So for example when working with figures such as flow charts or state diagrams, the figures will be modified or moved around. Making the links persistent will simplify updating and editing of the figures.

Yet another constraint of a graphical user interface is the limited display area. While some systems may be "scrollable", e.g. the aforementioned LiveBoard system, in order to obtain more "unwritten" areas, in some instances it is more desirable to merely "hide" or collapse certain information that has already been written. This hidden information may subsequently be recalled when desired. The object is to have more information space available for writing on. For example, when prioritizing a list, when one portion of the list is fixed it may be hidden, wherein more items on the list can then be displayed without having to scroll.

Various means for temporarily "hiding" information are known in the art. In text editing systems various lines of texts may be hidden and represented by a line of dashes or some other symbol. In systems with graphical user interfaces, icons may be used to represent "files", documents or applications. Other systems provide for "zooming" wherein levels of detail in an image can be modified. Flowcharting applications permit "off-page" designators which when selected cause the "off-page" portion of the flowchart to be displayed.

However, none of the foregoing approaches is particularly applicable to the requirements in a computer system having a freeform graphical user interface. Thus, it would be desirable to have a means by which displayed information in a graphics oriented system can be hidden or collapsed and which can be subsequently expanded to reveal all the information which it represents.

SUMMARY

A method and apparatus for representing a group of graphic objects so as to maximize usage of a display area is disclosed. The present invention provides a means for "collapsing" a group of graphic objects so that it is represented by a container icon. The container icon visually represents the group of graphic objects in a way that occupies a smaller amount of display area than the group of objects. The group is recallable (i.e. expanded) by "tapping" on the container icon. Alternatively, the group may be located on a separate accessible area of the display space. The container icon is itself a graphical object and can be moved, copied or deleted. Further, any change of attributes, e.g. color, of the graphical object causes a corresponding change to the group of graphic objects.

The collapse method of the present invention is comprised of the following steps: a user selects one or more graphics objects and causes them to be treated as a group; the user performs a collapse action; the system detects that the collapse action has been performed and that it is associated with the selected group of graphic objects; the system "saves" the group of graphic objects; and the system removes from the display the group of graphic objects and replaces with a container icon. Optionally, the system may generate a reference number for the collapsed icon. This has been found to be particularly useful when printing the contents of the display along with a page which contains the original uncollapsed group of graphic objects.

The expand method of the present invention is comprised of the user performing an expand action close to the container icon; the system detecting the expand action; the system retrieves the group of graphic objects associated with the container icon; and the system removes from display the container icon and replaces it with the retrieved group of graphic objects in the original location relative to the icon.

DETAILED DESCRIPTION OF THE PREFERRED EMBODIMENT

An improved system for manipulating graphic objects in a graphics based computer system are disclosed. In the description below various details have been omitted, such as the operation of touch screen displays, in order not to obscure the present invention. In other cases, details have been provided, such as the descriptions of a group of graphic objects, which would have been apparent to one of skill in the art, in order to more clearly point and describe the present invention.

The following terms are used in this description and have their indicated meanings:

Graphic Object: Any displayed object in 2D space.

Curve: A one dimensional graphic object created manually by the user (e.g. a pen stroke) or made by other means, such as by a gesture (e.g. rectangle resulting from a "[" gesture) or generated by the system (e.g. borders).

Pen Stroke: An action with a pen which becomes an ink stroke or a gesture.

Ink stroke: A curve that is persistent.

Gesture: A curve made with a pen stroke that is ephemeral and which is interpreted as an action.

Enclosure: An ink stroke that closes on itself and defines a region.

Enclosure Contents: One or more graphic objects positioned within the region defined by an enclosure.

Group: An enclosure plus its contents. A group can behave as a single graphic object, e.g. a tap gesture on its enclosure selects the group.

Selection: A set of graphic objects tagged as being selected.

Selection, enclosure: A gesture surrounding some graphic objects. This is the usual way to define a selection.

Link: An ink stroke touching one or two enclosures [i.e. lining them]. An enclosure may also be linked to itself.

Container Icon: A small graphic object that represents other graphic objects without displaying them.

Collapse: An operation that takes a selection and creates a container icon and replaces them with the icon.

Expand: An operation that takes a container icon and replaces it with its contained objects.

Alter: An operation that reshapes an enclosure and potentially the graphic objects it contains.

Split: An operation that takes an enclosure and splits it into two distinct enclosures, each with its own contents.

Fuse: An operation that takes two or more enclosures and combines them into a single enclosure that contains all the objects in the initial enclosures.

Highlighted Area: A contiguous part of a 2D surface, usually highlighted in some graphic manner. It has a perimeter edge, which serves as an enclosure.

Figure 1A:
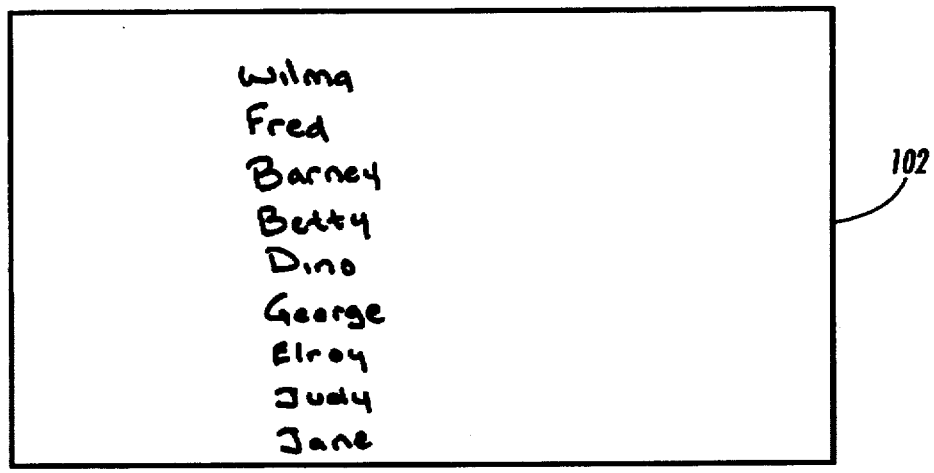
FIGS. 1a–1c illustrate an example of a scenario wherein the currently preferred embodiment of the present invention may be used.
Figure 1B:
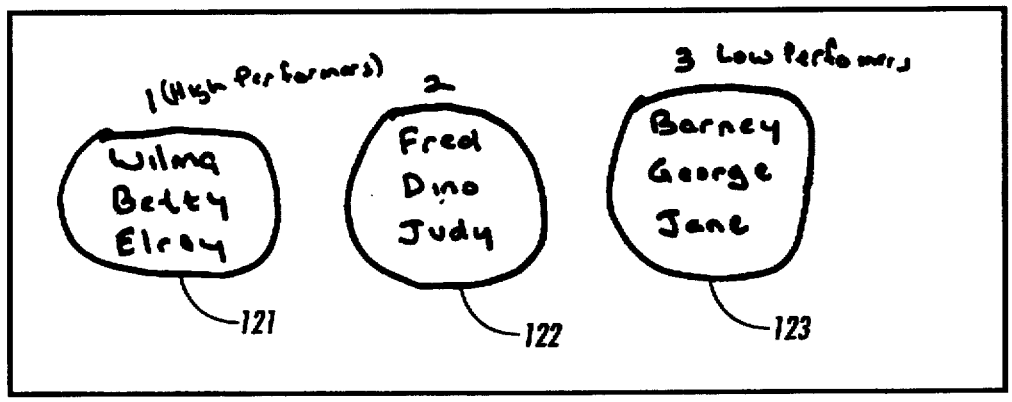
Figure 1C:
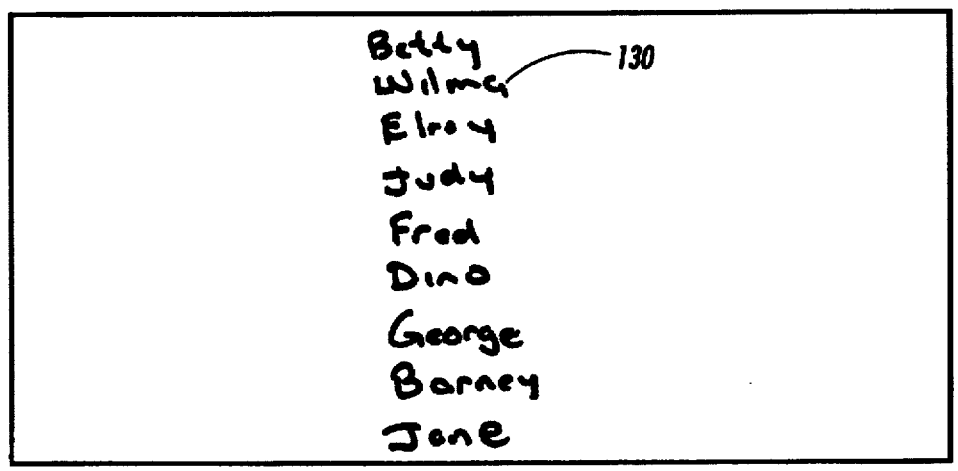

The present invention is useful for any system which manipulates graphic objects, such as drawing programs or pen based systems and the like. The present invention has been found particularly useful in support of collaborative activities such as meetings to rank priorities. In such an activity, users create lists of items and then manipulate the order or the spatial layout of the items. For example, with reference to FIGS. 1a–1c, the ranking of employees is being discussed. The first step is to write down the names of the employees in a list on a visual media that can be viewed by all participants such as a whiteboard. This is illustrated in FIG. 1a as list 101 written on display area 102. A filtering process then occurs where the employees are generally categorized as class 1, 2 or 3 performers and then ranked within a category. This is illustrated in FIG. 1b as class lists 121–123. In a system of the present invention, each of these names is represented by a set of graphic objects (e.g. ink strokes). Thus, the rearrangement of the names is accomplished by select and move operations. Finally, ranking is accomplished within each performance category and fused back together to yield the final ranking list 130 illustrated in FIG. 1c.

There are several important things to observe about this activity. It is critical that users be able to move list items around easily. This suggests that the items (e.g., the names) be grouped, so that they can be dragged as a unit. For example, the performance categories illustrated in FIG. 1b may be moved as a group. But the groups are not fixed; they change throughout the meeting. Items are sometimes put together and implicitly treated as a single unit. Also, annotations may be made on items, perhaps describing the reason for a rating. This annotation should be grouped with the item, e.g., so they move together. It has been determined that it would be useful for users to be able to fuse and split items and make annotations easily as they change their minds concerning the relationships of items or make notes associated with items. Users should also be able to manipulate items within a group independently of other groups.

The currently preferred embodiment of the present invention is a graphical technique for representing and manipulating persistent groupings of graphic objects. The key idea is to indicate groups by explicit enclosures and to allow graphical operations on the enclosures to modify the groups.

Figure 2:
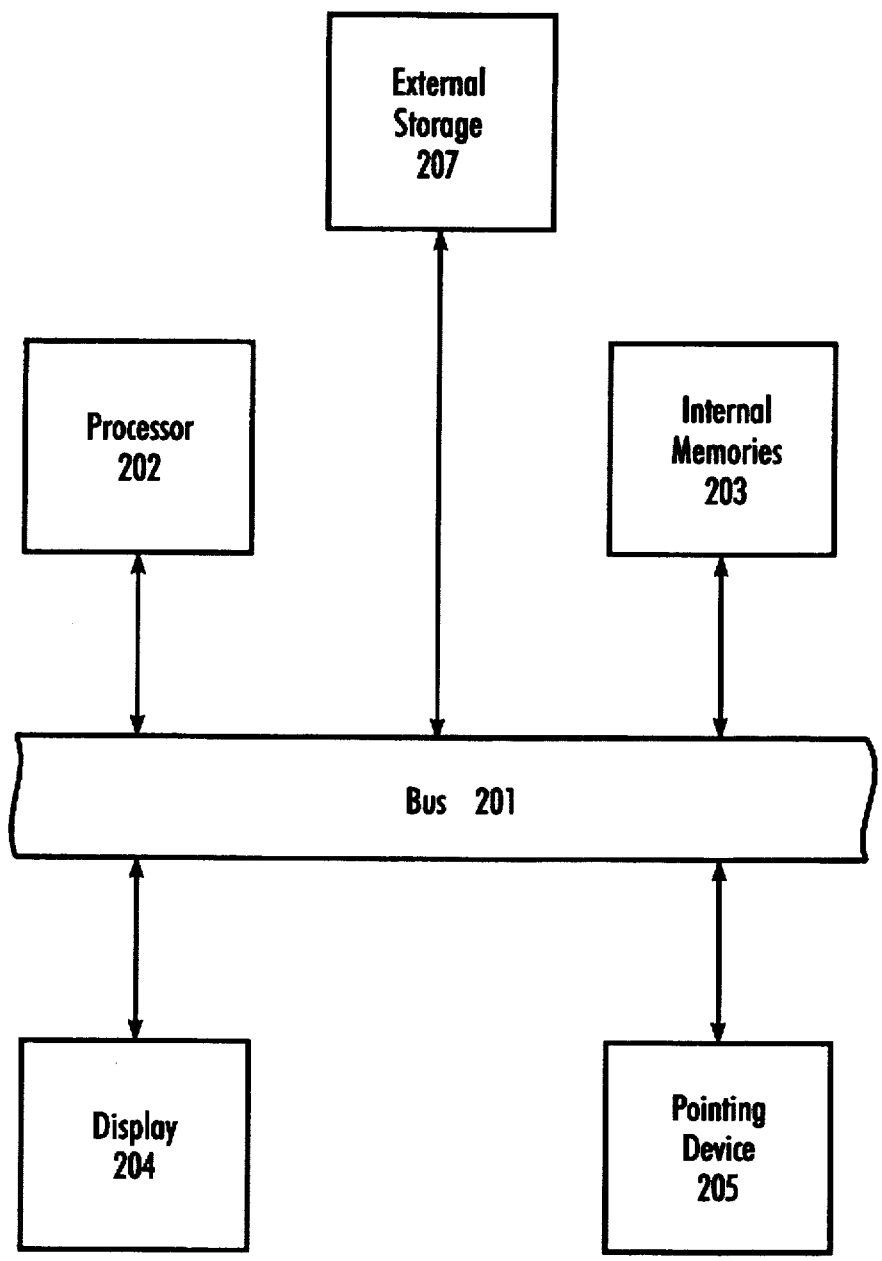
FIG. 2 is a block diagram of a computer based system as may be utilized in the currently preferred embodiment of the present invention.

Overview of the Graphics Based Computer System of the Currently Preferred Embodiment The computer based system as may be utilized in the present invention is illustrated with reference to FIG. 2. Referring to FIG. 2, the computer based system is comprised of a plurality of components coupled via a bus 201. The bus 201 illustrated here is simplified in order not to obscure the present invention. The bus 201 may consist of a plurality of parallel buses (e.g. address, data and status buses) as well as a hierarchy of buses (e.g. a processor bus, a local bus and an I/O bus). In any event, the computer system is further comprised of a processor 202 for executing instructions provided via bus 201 from Internal memory 203 (note that the Internal memory 203 is typically a combination of Random Access or Read Only Memories). When in operation, program instructions for carrying out the various functional components of the present invention are stored in internal memory 203. The processor 202 and Internal memory 203 may be discrete components or a single integrated device. The processor 202 and internal memory 203 comprise circuitry for performing the various processing functions described herein. Also coupled to the bus 201 is external storage 207. The external storage 207 is typically a high capacity storage media such as magnetic or optical disk storage.

Also coupled to the bus 201 is a display 204 and a pointing device 205. In the currently preferred embodiment, the pointing device 205 is a pen driven touch sensitive panel which is integrated with the display 204 as a touch screen display. Such touch screen displays are well known in the art and are utilized in such systems as Pen based system and for electronic whiteboard systems. However, the pointing device 205 and display 204 need not be integrated so that the pointing device 205 may also be a stylus, mouse, track-ball or other cursor control device.

Figure 3:
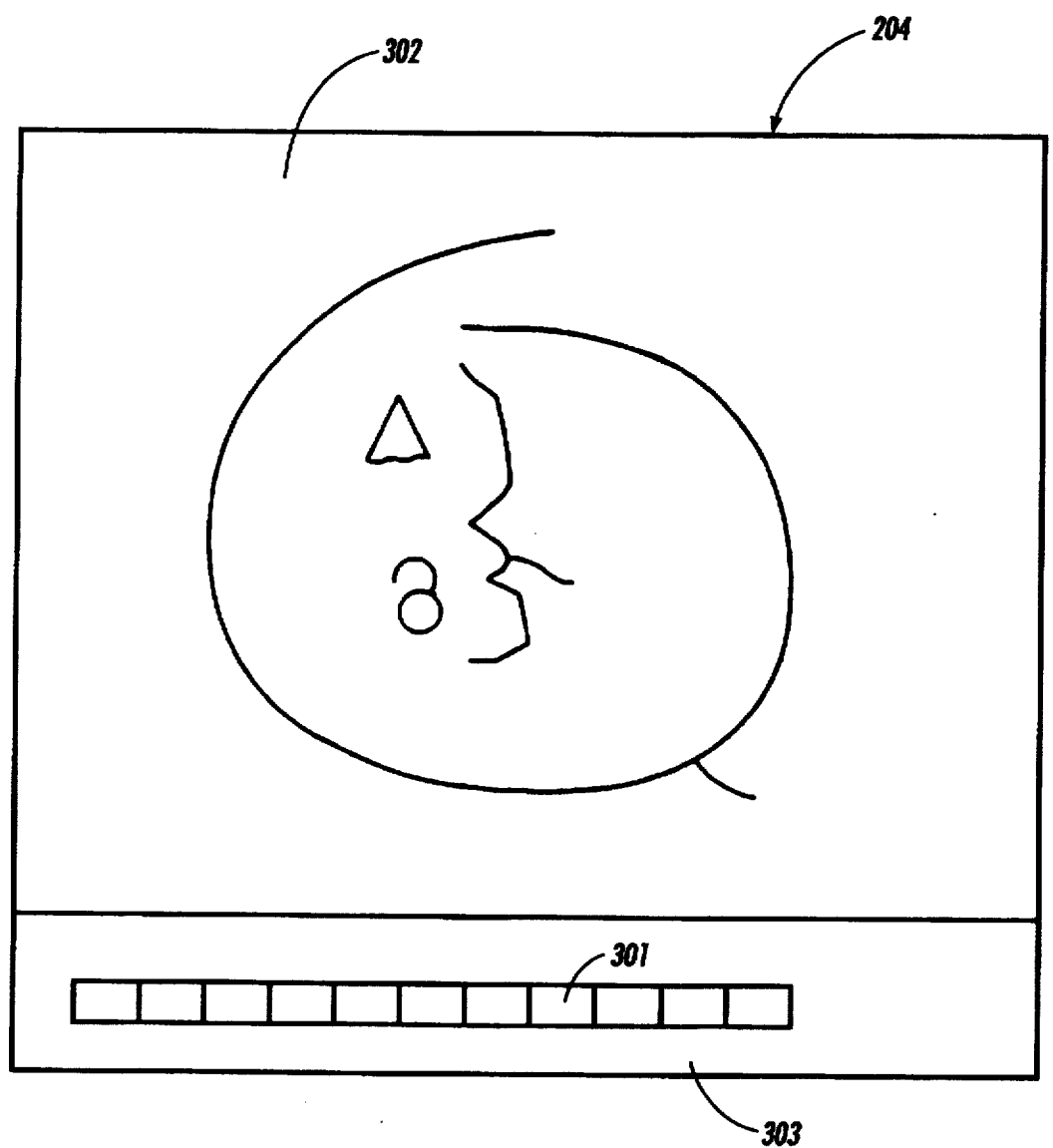
FIG. 3 is a representation of a basic graphical user interface and as may be displayed on the display and interfaced through the touch sensitive panel of FIG. 2.

FIG. 3 illustrates a particular implementation of a graphical user interface as may be used in the present invention. Referring to FIG. 3, the graphical user interface is displayed on display 204 and interacted with via touch panel 205. The graphical user interface employs a working surface and may employ a plurality of accessible functions 301 as is shown. The working surface 302 is where a user may draw various curves and where other graphic objects are displayed. The accessible functions 301 are positioned at the button area 303 of the display. The functions 301 may include operations for editing graphic objects (create, delete, move, shrink, etc.) or changing the operating mode of the touch panel 203 (e.g. switching from draw and gesture mode).

These functions may alternatively be accessed by a pull down menus that are commonly found in Windows oriented applications. These functions however are optional in designation, their principal objects being to define operations which are inherent in the operation of the system. These functions may perform the same functions that are invoked by gestures.

The currently preferred embodiment of the present invention is implemented on a pen based system having a Graphical User Interface (GUI). Such a GUI will typically support operations such as "tap" for selecting/deselecting a graphic object or "double tap" for invoking an operation that may be associated with the graphic object being tapped on. Once an object is selected it may be dragged and dropped to a desired location in the work space.

The work space of the currently preferred embodiment is of a free form so that graphic objects are generally independent of other graphic objects and graphic objects may have an arbitrary organization. This is consistent with how a whiteboard is used. However, to facilitate user operation of the work surface, the notion of implicit structures (hereinafter "structures") are supported. Various types of structures supported in the currently preferred embodiment and are described in EPA 0 667 567 A2, entitled "Apparatus and Method For Supporting the Implicit Structure of Freeform Lists, Outlines, Text, Tables, and Diagrams In A Gesture-Based Input System and Editing System", which is assigned to the same assignee of the present application. Conceptually a structure is a collection of graphic objects which have a particular relationship, e.g. a list of items. When a structure operation occurs the relationship amongst the items is retained. For example, when an item is entered into the middle of a list, the items below the place of insertion are moved down in order to make room for the inserted item.

The currently preferred embodiment of the present invention has been implemented as software programs in the C++ programming language, for use on a pen based system, such as the LiveBoard, running under the control of a suitable whiteboard emulation program.

Manipulation of Groups Of Graphic Objects

Figure 4:
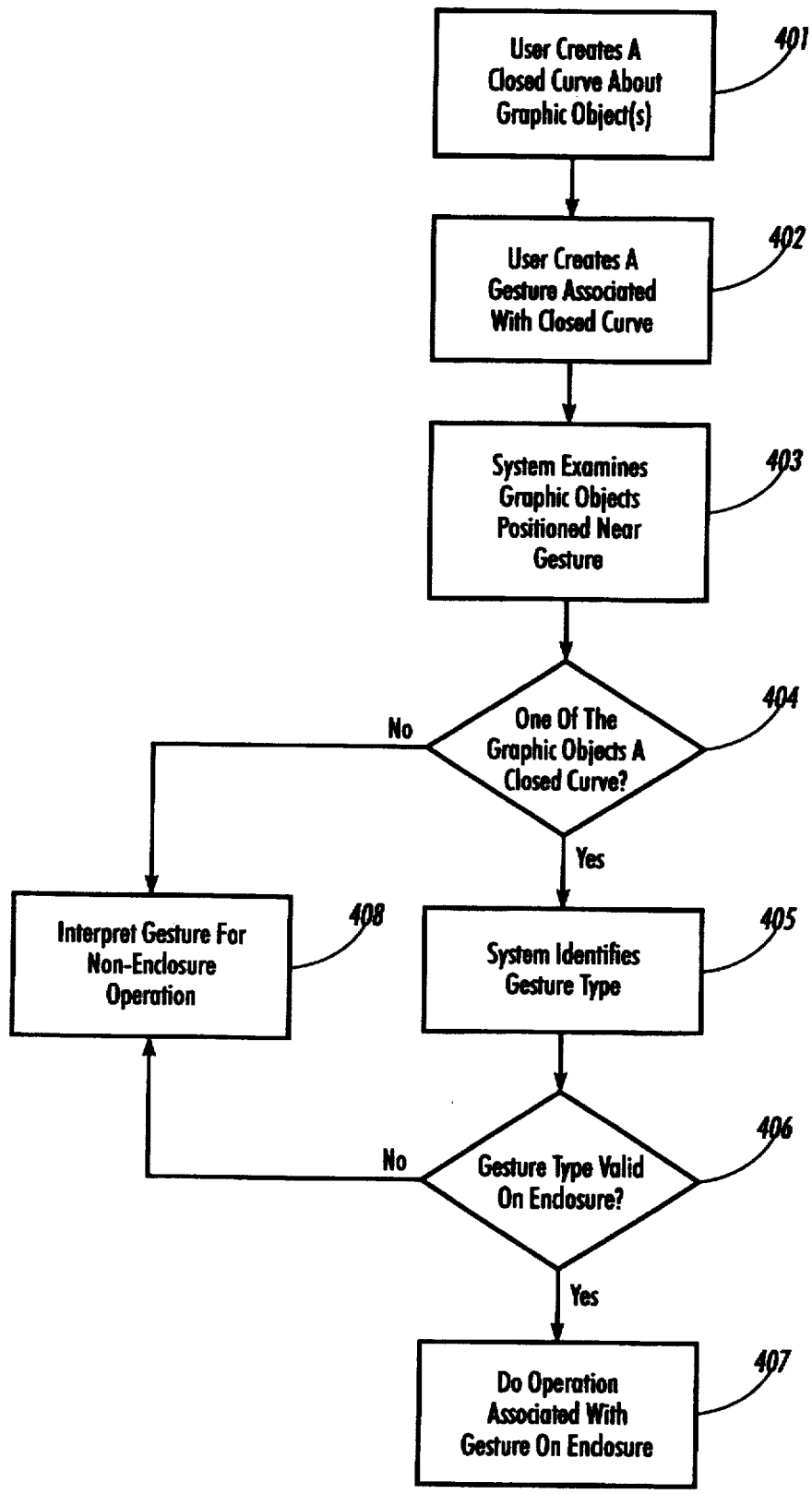
FIG. 4 is a flow diagram illustrating the basic user interface operation of a graphics based system as may be utilized in the currently preferred embodiment of the present invention.

The present invention enables various techniques for manipulating groups of graphic objects through alteration of the corresponding enclosure. The flow diagram of FIG. 4 illustrates the basic interaction which may cause an operation in a graphics input system in the currently preferred embodiment. Referring to FIG. 4, during the course of using an electronic whiteboard, a user creates a closed curve, e.g. by gesture or inking, about one or more graphic objects, step 401. This may occur as a result of organizing or rearranging the contents of the electronic whiteboard. After some period of time wherein the user may be performing other operations or generating other graphic objects, the user creates a gesture, step 402. The system then examines the graphic objects positioned near the gesture, step 403. A specific check is made to see if one of the graphic objects is a closed curve, step 404. In the currently preferred embodiment this is accomplished by checking the shapes of the graphic objects. However, it would be apparent to one of skill in the art to use other techniques, e.g. attaching a flag to the graphic object to indicate that it is a closed curve. In any event, if no graphic object is a closed curve, then the gesture is interpreted as a non-enclosure operation, step 408.

If one of the graphic objects is a closed curve, the system then identifies the gesture type, step 405. The gesture type may typically be identified by the shape and position of the pen stroke used to create the gesture. A determination is then made to determine whether the gesture operation is valid on enclosures, step 406. If not, the gesture is interpreted as a non-enclosure operation per step 408. If the gesture is determined to be one that is valid for operations on enclosures, then the closed curve is treated as an enclosure and the corresponding enclosure operation is performed, step 407. The various enclosure operations invoked by gestures are described below.

Graphic objects can be added or removed from a group by re-shaping its enclosure or by fusing enclosures. A group may be collapsed and represented by surrogate graphic objects called container icons (akin to a footnote). Other features and advantages of the currently preferred embodiment will become apparent in the foregoing description.

Enclosures

An important concept of the present invention is the notion of an enclosure as a persistent graphic object. To contrast with the prior art, a selection enclosure is an ephemeral graphic object that only exists while a selection operation is being performed. In order to manipulate multiple graphic objects with a single operation, each of the graphic objects must be "selected" as a group. It is often desirable to group a set of graphic objects so that the selection of the graphic objects is persistent. As described in the prior art, known techniques for modifying the contents of a group are awkward.

Enclosures as a persistent graphic object have the following characteristics:

They are typically an ink stroke, but may be any graphic object which defines a fixed region and its border (e.g. a highlighted area).

When an ink stroke, they are loop-shaped strokes wherein the beginning of the stroke is "close" to the end of the stroke. The ink stroke may also be a rectangle created using a rectangle generation operation found on many graphical user interfaces.

The interior of the enclosure defines a fixed region. So for example, each region can hold a list of items (represented by graphic objects).

Selecting the enclosure selects the group, i.e. the enclosure and the graphic objects within the region defined by the enclosure.

Enclosures may be erased without deleting the associated collection of graphic objects, i.e. enclosures are just like any other ink stroke.

Graphic objects may be selected and moved into or out of the region defined by the enclosure.

Operations On Enclosures

Figure 5:
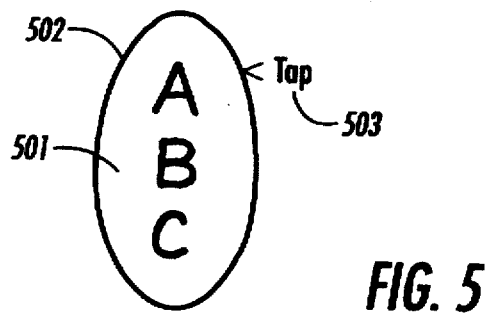
FIGS. 5–6 illustrate selection of an enclosure as may be performed in the currently preferred embodiment of the present invention.
Figure 6:
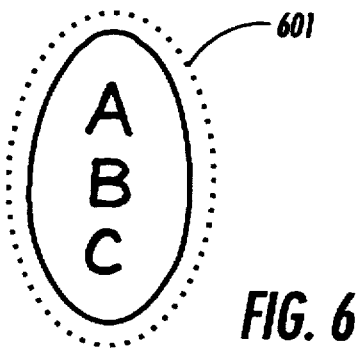

Since they are graphic objects, any operation that can be performed on a graphic object can be performed on an enclosure, e.g. erase, "wiping" a change of color or thickness, etc.. Any operation performed the enclosure will have the same effect on the group. To operate on the group, generally, the first step that must be performed is to select the enclosure. Selection is illustrated with respect to FIGS. 5–6. FIG. 5 illustrates graphic objects represented by "A B C" 501 that are enclosed by enclosure 502. To be recognized as an enclosure, the endpoints of the enclosure must be sufficiently close. This sufficient closeness will depend on such parameters as the resolution of the display area and the thickness of the stroke. Selection of the graphic objects 501 and enclosure 502 is indicated by the "tap" gesture 503 on the enclosure 502. Referring now to FIG. 6, the enclosure 502 has been selected along with the enclosed graphic objects 501. This is illustrated by the display of selection loop 601. Further, the enclosure 502 and graphic objects 501 now constitute a group. In the currently preferred embodiment selection is accomplished by a tap gesture on the enclosure, however techniques for selection (e.g. other types of gestures) may be used.

Once a group is selected other operations may be performed which will affect the entire group. The group may be moved (e.g. by dragging or wedge-right (>) gesture) or copied (e.g. by wedge-left (<) gesture), the color changed, the group shrunk or expanded. Other operations affecting the contents of selected enclosures are described below.

Altering Enclosures

Changing the contents of an enclosure may be accomplished by simply moving objects into or out of the enclosure, erasing objects, etc. As described above, a user may also alter an enclosure to change its shape. Changing an enclosure's shape provides a convenient technique for a user to add or remove graphic objects. A user may add graphic objects to a group by altering the enclosure so that it includes other graphic objects, or by enlarging the enclosure so that graphic objects may be moved into the enclosure or new graphic objects may be created within the enclosure. A user may remove graphic objects from a group by reshaping the enclosure so that the graphic objects to be removed are no longer within the region defined by the enclosure.

An alteration gesture is created by a pen stroke wherein the endpoints touch two points of the enclosure. Generally, the system detects the pen stroke and that it has touched two points of a closed curve (i.e. an enclosure). The pen stroked is then treated as an enclosure gesture which alters the shape of the closed curve based on where the pen stroke touched the enclosure.

Figure 7:
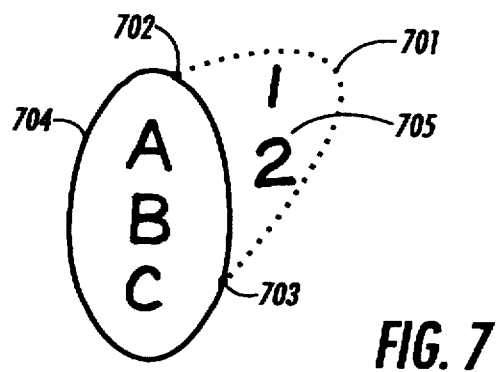
FIGS. 7–8 illustrate alteration of an enclosure to add graphic objects to the enclosure as may be performed in the currently preferred embodiment of the present invention.
Figure 8:
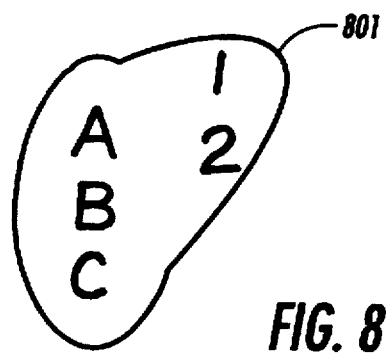

Adding graphic objects to an enclosure is illustrated in FIGS. 7-8. Referring to FIG. 7 a pen stroke 701 touches enclosure 704 at a first point 702 and at a second point 703. This causes the pen stroke 701 to be treated as an alteration gesture so that the enclosure 704 is to be altered accordingly. In FIG. 7, the graphic objects "1 2" 705 are to be added to the group. Referring now to FIG. 8, when completed an enclosure 801 has been created which has the shape of the original enclosure 704 with the shape of the pen stroke 701 added as a "bump".

Figure 9:
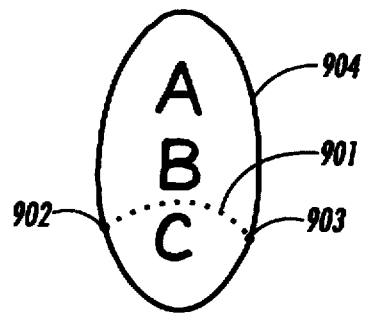
FIGS. 9–10 illustrate alteration of an enclosure to remove graphic objects from the enclosure as may be performed in the currently preferred embodiment of the present invention.
Figure 10:
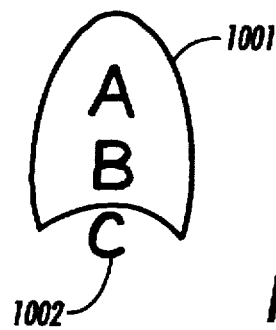

FIGS. 9-10 illustrates alteration of an enclosure to remove graphic objects. Referring to FIG. 9, a pen stroke 901 touches enclosure 904 at a first point 902 and at a second point 903. As above, this causes the pen stroke 901 to be treated as an alteration gesture. However, here it is determined that the pen stroke is within the region defined by enclosure 904 so the alteration is one that "cuts-out" a portion of the region. Referring now to FIG. 10, this results in a new enclosure 1001 takes a shape removing a portion corresponding to the pen stroke 901. This has effectively removed the graphic object 1002, i.e. the letter "C" from the group.

For an alteration gesture which removes graphic objects a determination must be made as to what is part of the enclosure is to be "cut-out". The currently preferred embodiment operates on the heuristic that the "largest" portion of the enclosure is the one to be retained.

Splitting an Enclosure

Splitting an enclosure creates two new enclosures and removes the original enclosure. For example, when manipulating a list, it may be determined that it would be more appropriate to manipulate only sub-lists of the list. The splitting gesture is caused by pen stroke created by a back and forth motion. The pen stroke will have been at least in part contained in the region defined by the enclosure to be split. The splitting gesture operates such that it spatially detects the enclosures that it will be operating on and the location of the gesture indicates the splitting location.

Figure 11:
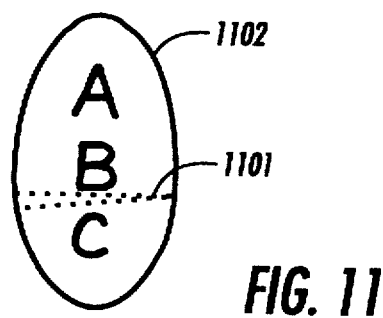
FIGS. 11–12 illustrate splitting an enclosure using a back and forth gesture as may be performed in the currently preferred embodiment of the present invention.
Figure 12:
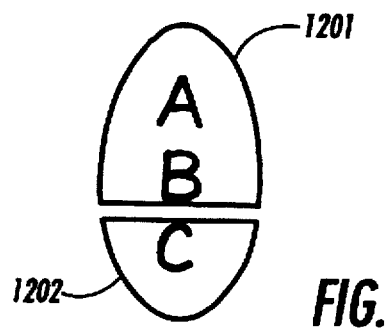

FIGS. 11-12 illustrate splitting an enclosure using a splitting gesture to create two enclosures from the single enclosures. Referring to FIG. 11, a splitting gesture 1101 is drawn which is within the region defined by the enclosure 1102. The splitting gesture causes the enclosure 1101 to be split approximately at the point where the gesture occurred. This is illustrated in FIG. 12 by the enclosures 1201 and 1202.

Figure 13:
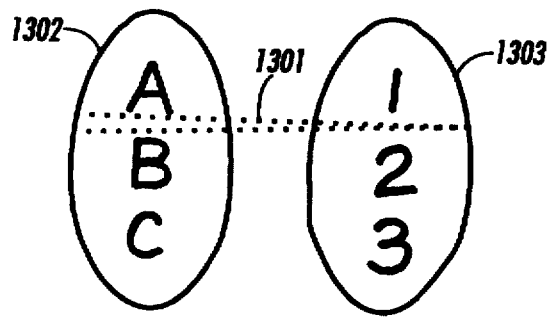
FIGS. 13–14 illustrate splitting multiple enclosures using a back and forth gesture as may be performed in the currently preferred embodiment of the present invention.
Figure 14:
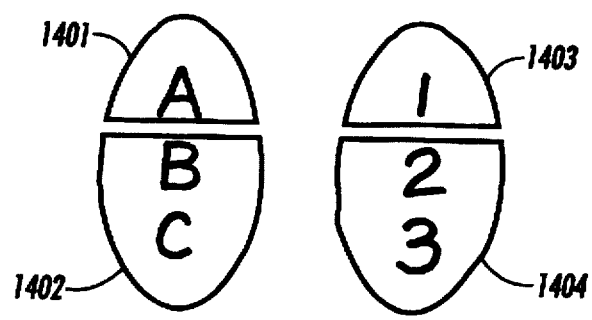

FIGS. 13-14 illustrate that the splitting gesture can be performed across multiple enclosures resulting in the splitting of both enclosures. So referring to FIG. 13, splitting gesture 1301 crosses enclosures 1302 and 1303. Referring now to FIG. 14, the enclosures 1401 and 1402 are created from the enclosure 1302 and the enclosures 1403 and 1404 are created from enclosure 1303.

Fusing Enclosures

Figure 15:
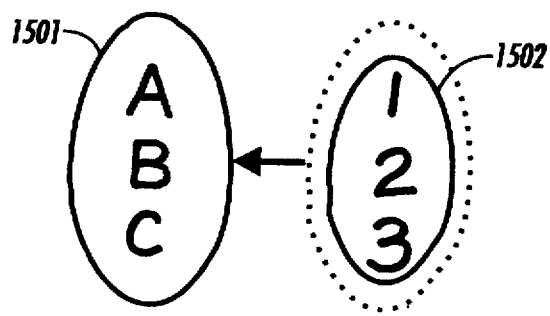
FIGS. 15–17 illustrate implicit fusing by moving a first enclosure to overlap a second enclosure, as may be performed in the currently preferred embodiment of the present invention.
Figure 16:
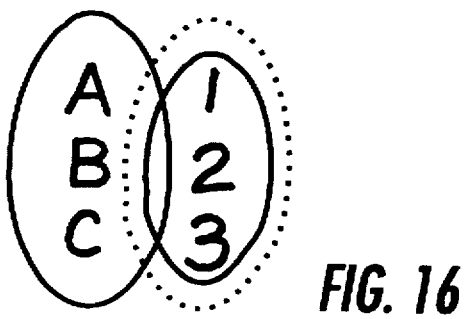
Figure 17:
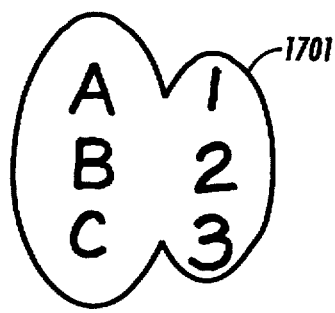

Fusing enclosures causes the contents of the fused enclosures to be combined under a single enclosure. The fusion may be implemented so that it is implicit or explicit. FIGS. 15-17 illustrate an example of implicit fusing. Referring to FIG. 15 a selected enclosure 1502 is moved so that it overlaps with an enclosure 1501. The result of the move is illustrated in FIG. 16. The fusing is illustrated in FIG. 17 where the contents of each of enclosures 1501 and 1502 are in the region of new enclosure 1701. The shape of enclosure 1701 corresponds to the boundary of the overlapped enclosures 1501 and 1502.

However, implicit fusing can cause undesired results. For example, while moving enclosures, one may be accidentally placed so that it overlaps another. This would cause them to be accidentally fused and would require the enclosures to be split apart. Moreover, for some uses of a graphical user interface it is desirable to have closed curves which overlap, e.g. drawing Venn Diagrams. So explicit fusing is provided as the default in the currently preferred embodiment. In explicit fusing a fusing gesture, here a pen stroke in the shape of a closed curve in particular positions, is used to fuse enclosures. The fusing operation will be performed on each of the enclosures that the fusing gestures touches.

Figure 18:
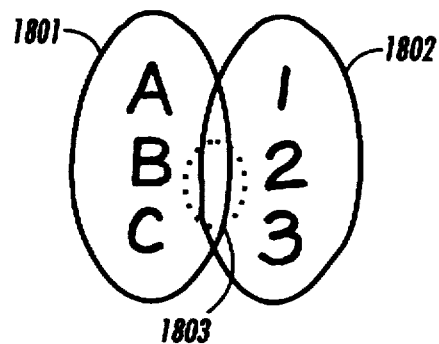
FIGS. 18–19 illustrate explicit fusing using a fusion gesture when a first enclosure overlaps a second enclosure, as may be performed in the currently preferred embodiment of the present invention.
Figure 19:
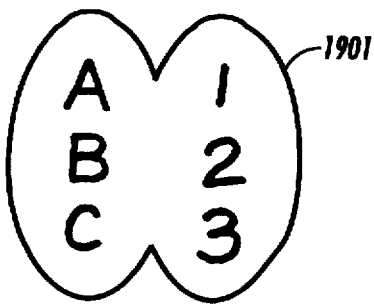

FIGS. 18-19 illustrate a simple example of explicit fusing when enclosures overlap. Referring to FIG. 18, enclosures 1801 and 1802 overlap. The fusing loop gesture 1803 is then performed. The result is illustrated in FIG. 19 where the contents of each of enclosures 1801 and 1802 are in the region of new enclosures 1901. The shape of enclosure 1901 corresponds to the boundary of the overlapped enclosures 1801 and 1802.

Figure 20:
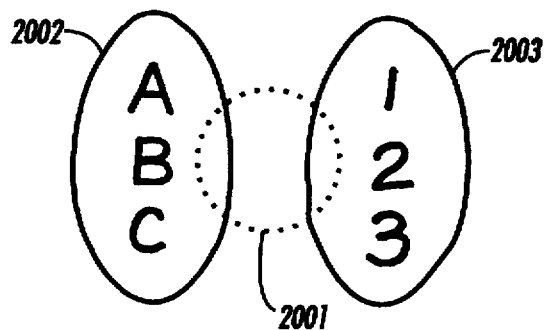
FIGS. 20–21 illustrate explicit fusing by using a fusion gesture across the enclosures to be fused, as may be performed in the currently preferred embodiment of the present invention.
Figure 21:
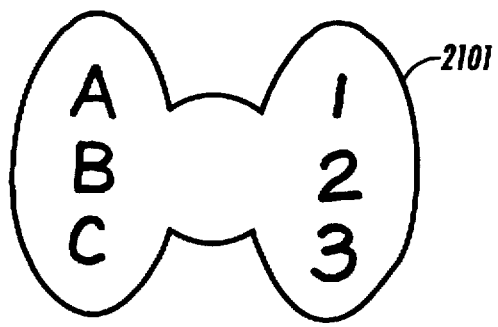

FIGS. 20-21 further illustrates explicit fusing using the fusing gesture. Referring to FIG. 20, the enclosures 2002 and 2003 do not overlap. A fusing gesture 2001 touches the boundaries of both enclosures 2002 and 2003. This results in the enclosure 2101 of FIG. 21. The shape of the resulting enclosure 2101 takes on the shape of the fusion gesture 2001 as if it were connecting the enclosures 2002 and 2003.

A further means for fusing enclosures is described below with reference to Links between enclosures.

Links

Links are ink strokes that are used to provide a visual connection between one or more enclosures. Links have the following characteristics:

Links are associated with at least one enclosure (i.e. one-ended) and at most two enclosures. To be associated with an enclosure a link end point must "touch" the enclosure.

An enclosure may have multiple links.

Selecting an enclosure highlights its links.

Links are free form, i.e. can be any shape.

Links associated with an enclosure are persistent so that they will reshape to maintain contact when the enclosure is moved/enlarged/or shrunk, i.e. the connections between enclosures provided by the links are always preserved.

Links may altered by selecting and moving the link endpoints.

Figure 22:
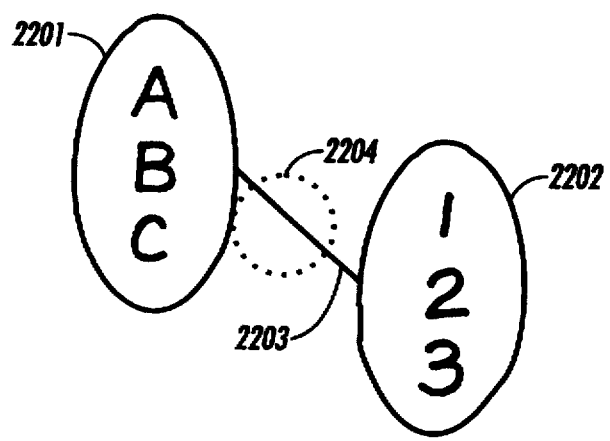
FIGS. 22–23 illustrate explicit fusing by performing a fusion gesture on a link between the enclosures to be fused, as may be performed in the currently preferred embodiment of the present invention.
Figure 23:
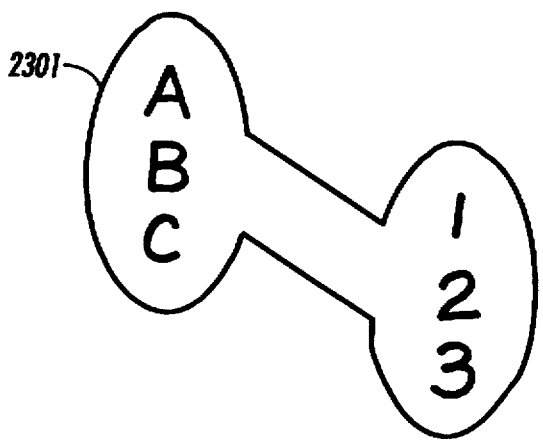

One manner in which links may be used is for fusing enclosures. Explicit fusion is accomplished by performing a fusing gesture so that it touches a link. This is illustrated in FIGS. 22–23. Referring to FIG. 22, enclosures 2201 and 2202 are linked by link 2203. A fusing gesture 2204 is performed which touches the link 2203. The result is the enclosure 2301 of FIG. 23. The shape of the enclosure 2301 is one that connects the two enclosures along the link. After the enclosures have been fused, the link 2203 is removed.

Figure 24:
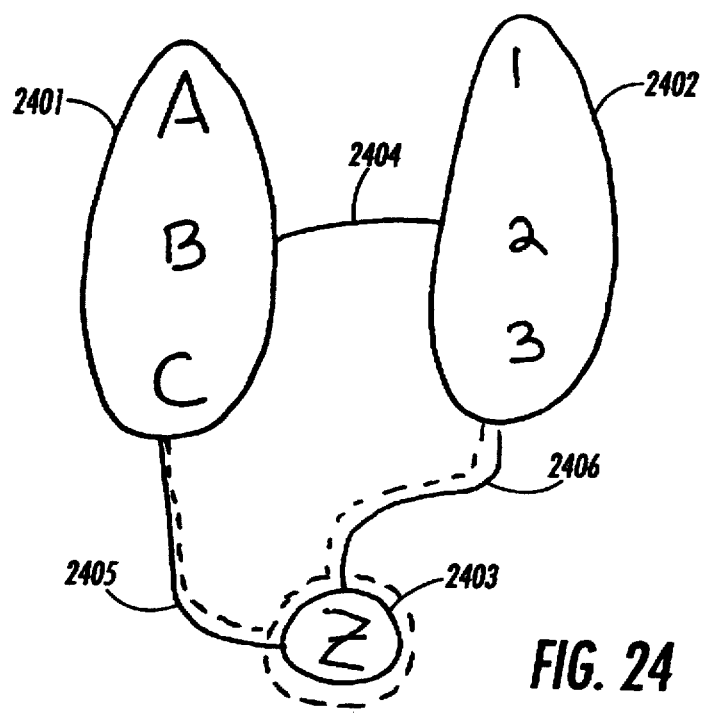
FIGS. 24–25 illustrate selecting of enclosures and corresponding links as well as reshaping links when enclosures are moved, as may be performed in the currently preferred embodiment of the present invention.
Figure 25:
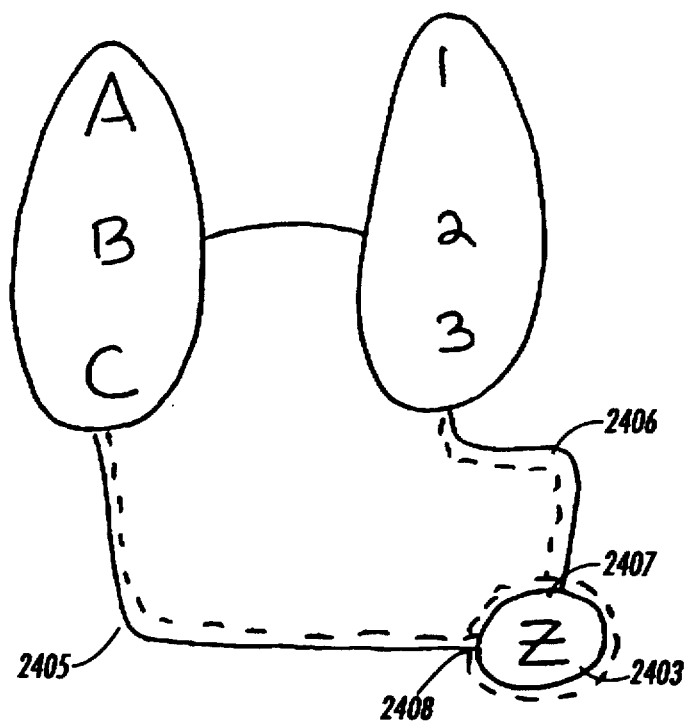

FIGS. 24–25 illustrate the selecting of enclosures and associated links and the reshaping of links when an enclosure is moved. Referring to FIG. 24, enclosure 2401 is linked to enclosure 2402 via link 2404 and to enclosure 2403 via link 2405. Enclosures 2402 and 2403 are linked via link 2406. Enclosure 2403 is selected which causes links 2405 and 2406 to also be selected. This is illustrated by the dashed outline of enclosure 2403 and links 2405 and 2406. In FIG. 25 enclosure 2403 has been moved which causes links 2405 and 2406 to be reshaped. It should be noted that while clearly reshaped, link 2406 has maintained its basic shape characteristics This is accomplished by a reshaping technique which uses the static endpoint of a link as an anchor position and scales and/or flips the reshaped link depending on where the enclosure is moved. Finally, it should be noted that the endpoints 2407 and 2408 of the respective links maintain their position on the enclosure 2403 as the enclosure is moved.

Figure 26:
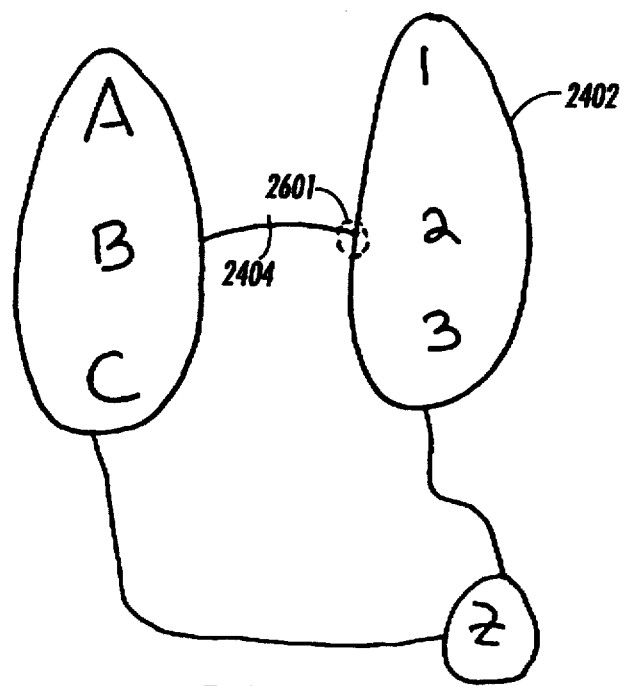
FIGS. 26–27 illustrates selecting a link endpoint on one enclosure and moving to another enclosure, as may be performed in the currently preferred embodiment of the present invention.
Figure 27:
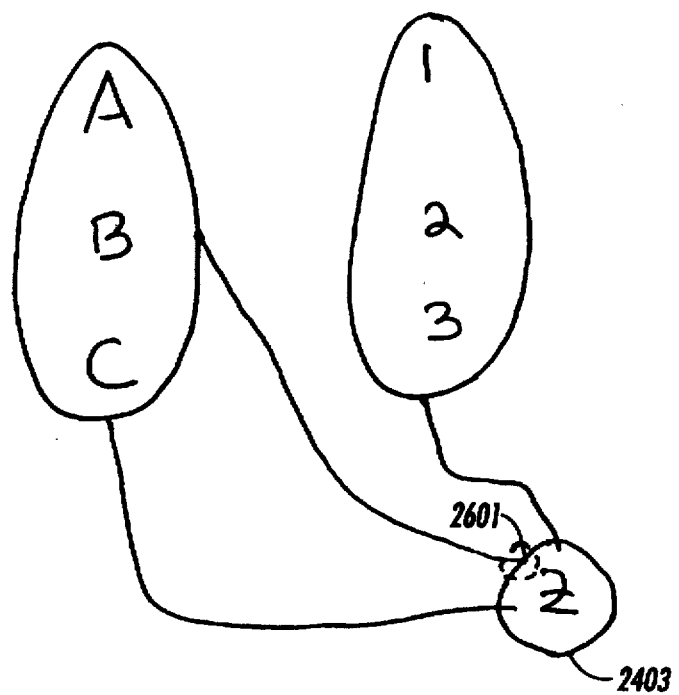

FIGS. 26–27 illustrate the selection and movement of link endpoints. Movement of link endpoints is desirable when a figure needs to be rearranged or otherwise changed. Referring to FIG. 26, endpoint 2601 of link 2404 has been selected. The endpoint 2601 here lies on enclosure 2402. Selection of a link endpoint is indicated by the dashed circle about the endpoint. Once selected the endpoint may be moved. The result of such movement is illustrated in FIG. 27. Referring to FIG. 27, the endpoint 2601 has been moved to the enclosure 2403.

Providing links between enclosures is useful, particularly when repositioning the enclosures. Being able to retain the visual association between the enclosures even as they are moved helps provide unencumbered usage of the graphics based system.

Detaching a link from an enclosure may be accomplished in one of two ways. First, the enclosure may be altered so that it no longer "touches" the endpoint of the link. Alternatively, the endpoint of the link may be selected and moved so that it no longer touches the enclosure. Detaching of a link may be useful when the heuristic for maintaining persistence causes undesirable results such as the link crossing through the enclosure.

A link may also be attached to an enclosure using similar techniques. First, the enclosure may be altered so that it "touches" the endpoint of the link. Second the endpoint of the link may be selected and moved so that it touches the enclosure.

Collapsing an Enclosure

Collapsing an enclosure is a very useful feature that enables space on a display to be optimized. Collapsing an enclosure replaces the enclosure and the objects it contains with a container icon. The container icon in the currently preferred embodiment has a balloon shape and may optionally display a reference number (or other identifying symbol). The reference number is akin to a footnote number.

A container icon is a graphic object that represents an underlying group of graphic objects. Accordingly, a container icon can be moved, deleted or have it's attributes changed. When the attributes of a container icon are changed, a corresponding change will occur to the underlying group of graphic objects. So for example, if the color of the container icon is changed, each of the graphic objects will change to the color of the container icon. Of course it would be apparent to one of skill in the art that one could "turn-off" such a feature so that attribute changes do not flow through to the underlying group of graphic objects.

In the currently preferred embodiment, collapsing is not limited to enclosures and their content (although enclosures provide a very convenient means for identifying groups to be shrunk). For example, collapsing may also be applied to a selected subset of a list of items or to freeform selection of graphic objects.

Figure 28:
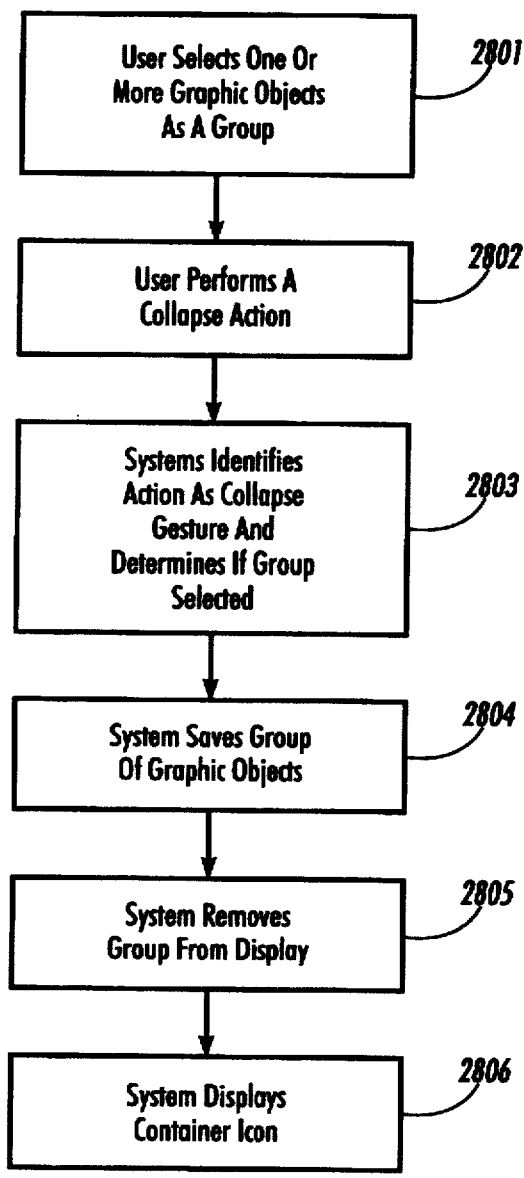
FIG. 28 is a flowchart illustrating the steps for collapsing a group and replacing it with a container icon as may be performed in the currently preferred embodiment of the present invention.

FIG. 28 is a flowchart illustrating the steps for collapsing a group and replacing with a container icon. First, a user selects one or more graphics objects and causes them to be treated as a group, step 2801. This may be typically performed by selecting an enclosure (which in turn causes selection of all the graphic objects within the region defined by the enclosure). However, any means for grouping or selecting one or more graphic objects may be used. The user then performs a collapse action, step 2802. As described above, the collapse action may be a pen stroke in the shape of a balloon. The system then identifies the pen stroke as a collapse gesture and determines if a group has been selected, step 2803. Of course if no group has been selected, no collapse can be performed because there is no indication as to what is to be collapsed. The system then "saves" the group of graphic objects, step 2804. This is so the group can be readily expanded. The system then removes from the display the group of graphic objects, step 2805 and displays a container icon, step 2806. The container icon is like any graphic object, i.e. it can be moved, colored, erased etc.. Such an operation performed on the container icon will have the same effect on all the collapsed objects. At this point when the container icon is created, it is also "selected" so any subsequent operations may be performed on it.

Optionally, once a group has been selected, the system generates a reference number for the group and display it on the container icon. The reference number is subsequently used for referencing the group. This is because the group may be stored on a different page much like an endnote.

Figure 29:
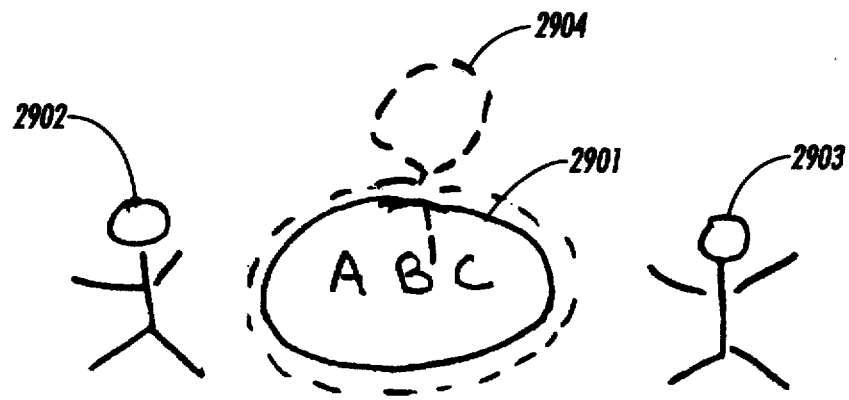
FIGS. 29–30 illustrate collapsing of a selected enclosure without links as may be performed in the currently preferred embodiment of the present invention.
Figure 30:
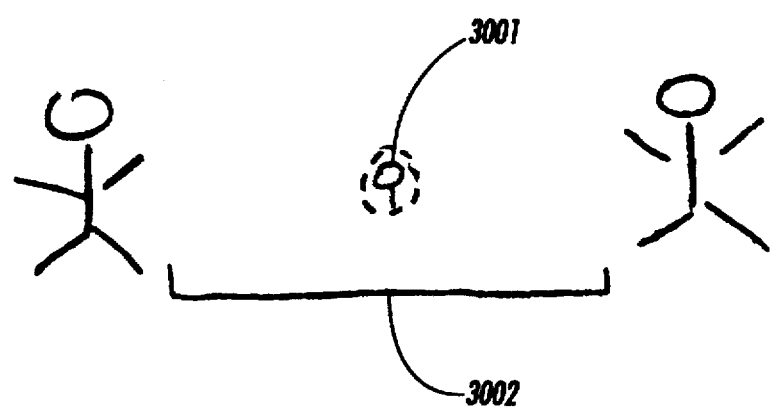

The location at which the container icon is initially displayed will depend on various factors associated with the enclosure. If the enclosure is without links, the container icon will be displayed at the approximate center of the area occupied by the enclosure. This is illustrated in FIGS. 29–30. Referring to FIG. 29, enclosure 2901 and associated graphic objects are positioned between graphic object 2902 and 2903. The enclosure 2901 has been selected and a collapse gesture 2904 performed. The result is illustrated in FIG. 30. Referring to FIG. 30, the resulting container icon 3001 is positioned in the center of the area 3002 formerly defined by the enclosure 2901.

It should be noted that that a collapse may also be performed on a group created via a freeform selection. The operation and result would be identical to that described above for an enclosure with no links.

Figure 31:
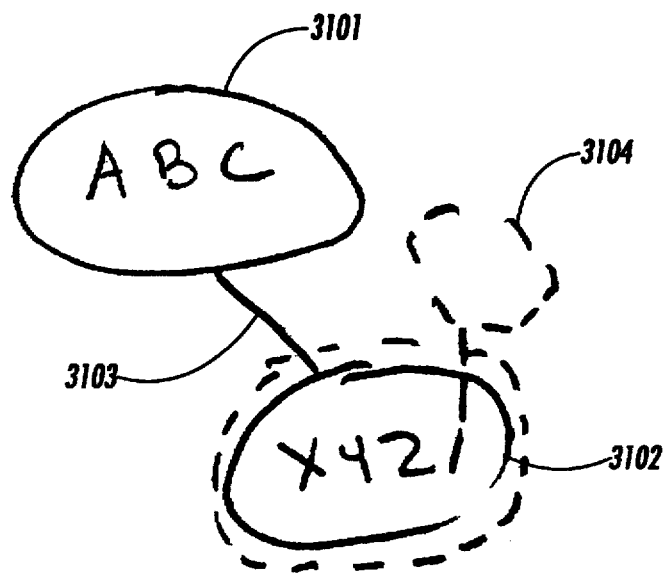
FIGS. 31–32 illustrate collapsing of a selected enclosure which has an associated link as may be performed in the currently preferred embodiment of the present invention.
Figure 32:
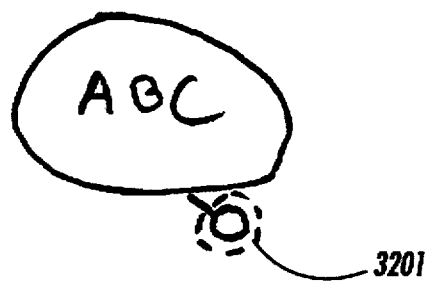

If the enclosure has a link that has been selected with it for the collapse, the container icon is displayed so that its stem replaces the link attached to the enclosure. This is illustrated in FIGS. 31–32. Referring to FIG. 31, a first enclosure 3101 is linked to a second enclosure 3102 via link 3103. In this figure, the enclosure 3102 has been selected. A collapse gesture 3104 has been performed that is directed to the selected enclosure 3102. The result of the collapse is illustrated in FIG. 32. Referring to FIG. 32, the container icon 3201 has been created to represent enclosure 3102 and its contents.

Figure 33:
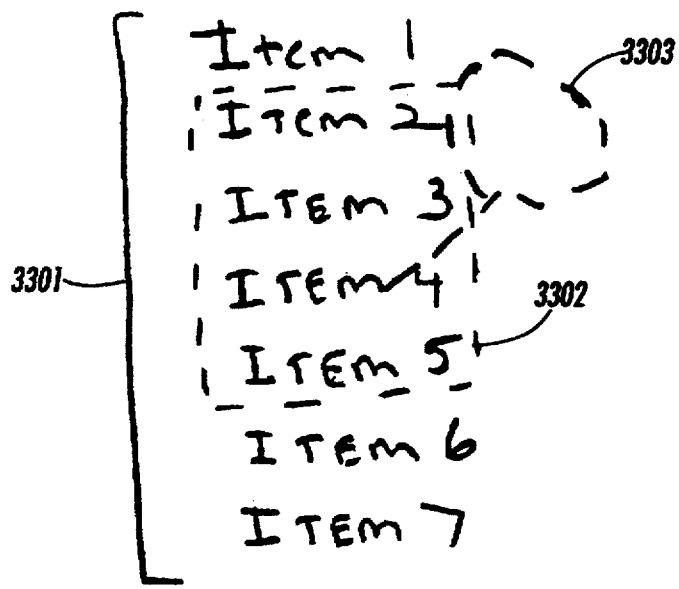
FIGS. 33–34 illustrate collapsing of a selected subset of list items in a list structure as may be performed in the currently preferred embodiment of the present invention.
Figure 34:
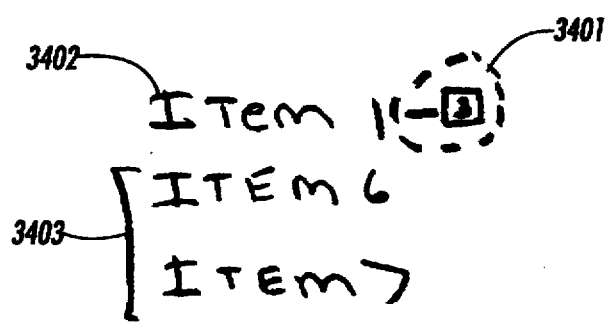

If the enclosure defines a subset of items in a list structure, the container icon is placed at the end of the list item above the selected subset. This is illustrated in FIGS. 33–34. Referring to FIG. 33, a work surface has displayed thereon a list 3301. A subset 3302 of the list has been selected and a collapse gesture 3303 performed on the subset 3302. The result is illustrated in FIG. 34. Referring to FIG. 34, a container icon 3401 has replaced the subset 3303 and is attached to the end of the list item 3402 positioned above the subset 3303. Further, the remainder of the list 3403 has moved upwards to occupy the space vacated by the subset 3303. This automatic reclamation of work space area is performed with respect to operations on list structures.

Figure 35:
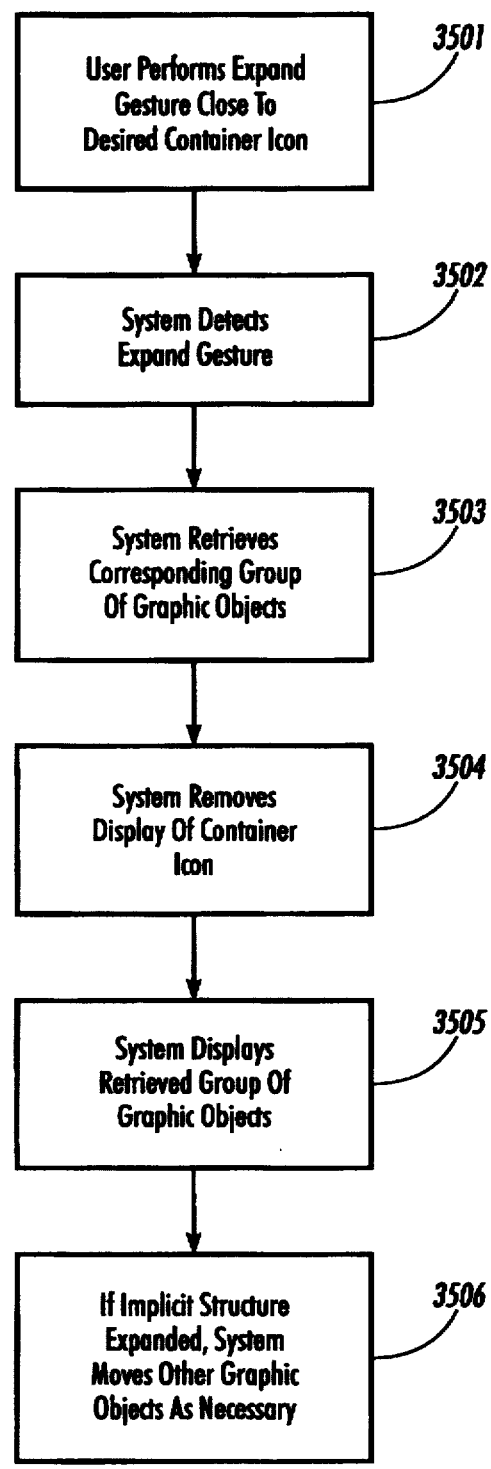
FIG. 35 is a flowchart illustrating the steps for expanding a container icon to display the group of graphic objects which it represents as may be performed in the currently preferred embodiment of the present invention.

The inverse operation of a collapse is to expand a container icon. When a container icon is expanded, e.g. via a "double tap" operation, then the collapsed enclosure is restored to the display area and the container icon removed. FIG. 35 is a flowchart illustrating the steps for expanding a container icon. First, the user performs the expand gesture close to the desired container icon, step 3501. This is typically done by a "double tap" gesture. Next, the system detects the expand gesture, step 3502 and retrieves the associated group of graphic objects, step 3503. The system then remove from the display the container icon, step 3504 and the system displays the retrieved group of graphic objects, step 3505. In the event that what is expanded is part of an implicit structure, other graphic objects may be moved as necessary in order to maintain the implicit structure, step 3506.

When a container icon is expanded, the place on the display on which it expands will correspond to what was collapsed. For example if it is part of a list structure, expansion will cause the other portions of the list to move. Or it may expand in place directly on the surface relative to the position of the container icon. This may occur directly on the surface or it may occur as an "overlay" on the surface. When expansion occurs directly on the surface, the expansion may overwrite existing graphic objects on the work surface. When expansion occurs as an overlay, existing graphic objects may be occluded, but they are not destroyed. Finally, expansion may occur as a link to another place. In such an expansion available area on the work surface is identified where expansion takes place. A link is created to the location of the container icon where the expansion operation was initiated.

Figure 36:
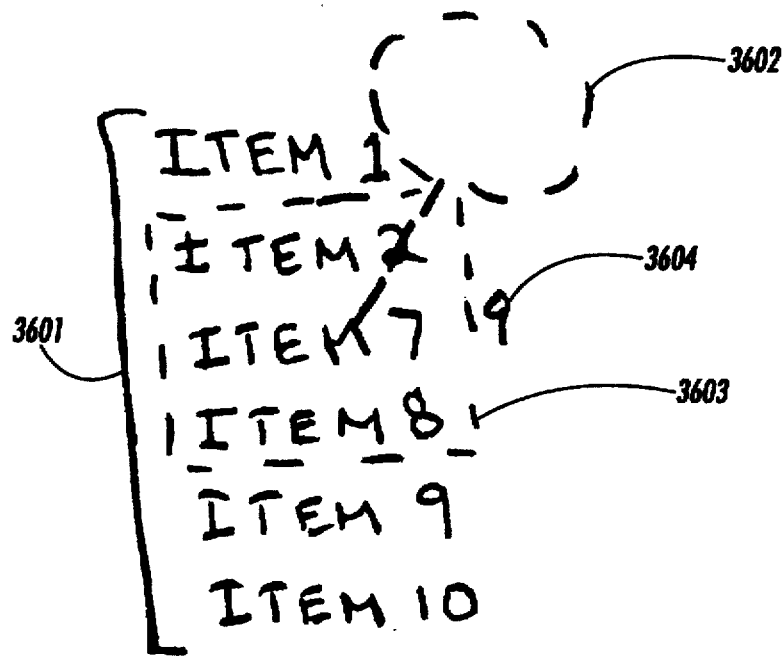
FIGS. 36–37 illustrate the nesting of collapsed subsets of items in a structured list as may be performed in the currently preferred embodiment of the present invention.
Figure 37:
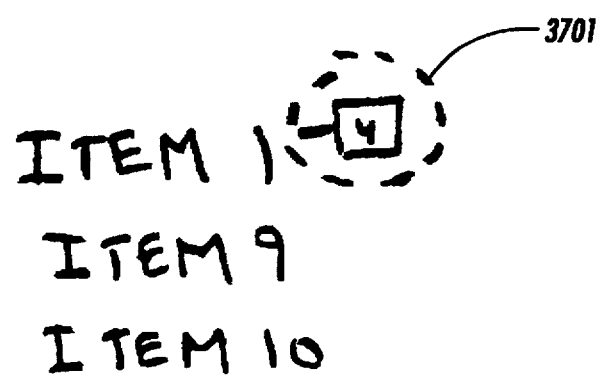

It should also be noted that collapsing may be nested. So for example in an outline, one level of sub-headings may be nested within another level of subheadings. This is illustrated with reference to FIGS. 36–37. FIG. 36 illustrates a list 3601 having a container icon 3602 which represents a collapsed subset of list items. A selection 3603 of another subset includes the container icon 3602. A collapse gesture 3604 is performed and the result illustrated in FIG. 37. Referring to FIG. 37, a container icon 3701 is generated which represents the contents of the selection of list items from FIG. 36. Such nesting may also be applied be beneficial for other types of structures, e.g. outlines.

Figure 38:
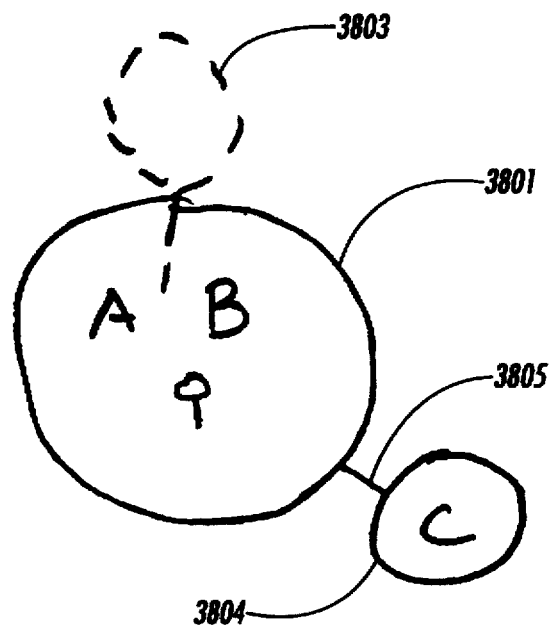
FIGS. 38–39 illustrate the nesting of collapsed enclosures as may be performed in the currently preferred embodiment of the present invention.
Figure 39:
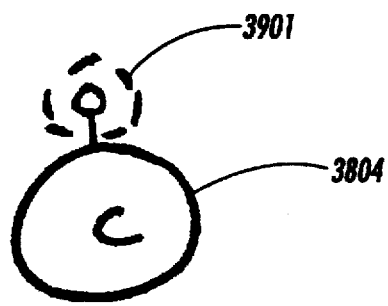

Nesting is not limited to list structures. Container icons representing any types of groups and their corresponding enclosures may be nested. This is illustrated with reference to FIGS. 38–39. Referring to FIG. 38, an enclosure 3801 includes within it a container icon 3802. The container icon 3802 may represent a previously collapsed enclosure or other type of selection. Note that the enclosure 3801 may also be a free form selection. Also note that the enclosure 3801 is linked to enclosure 3804 via link 3805. A collapse action is performed with respect to the container icon 3802 and the result illustrated in FIG. 39. Referring to FIG. 39, a container icon 3901 is generated which represents the contents of the enclosure 3801 and the contents represented by container icon 3802 from FIG. 38. Further, the stem of container icon 3901 is connected to the enclosure 3804, replacing the link 3805.

Thus, an improved system for manipulating graphic objects in a graphics based computer system has been disclosed. While the present invention is described with respect to a preferred embodiment, it would be apparent to one skilled in the art to practice the present invention in alternative embodiments supporting gesture based input. Such alternate embodiments would not cause departure from the spirit and scope of the present invention.

We claim:

1. On a graphics based computer system wherein graphic objects can be drawn on a work surface, a method for representing a group of graphic objects with a container icon, said container icon acting as a reference to said group of graphic objects, said method comprising the steps of:

a) a user causing said group of graphic objects to be selected;

b) said user performing a collapse action on said selected group of graphic objects;

c) said system collapsing said selected group of graphic objects so that they are represented by said container icon by performing the substeps of:

c1) storing a copy of said group of graphic objects to be represented by a container icon;

c2) removing said group of graphic objects to be represented by a container icon from said display; and c3) displaying a container icon representing said selected group of graphic objects.

2. The method as recited in claim 1 wherein prior to said substep c3) displaying a container icon representing said selected group of graphic objects performing the substep of determining a reference number for said container icon and wherein said container icon is displayed with said reference number.

3. The method as recited in claim 2 further comprising the step of moving said selected group of graphic objects to another page and where they may be indexed by said reference number.

4. The method as recited in claim 1 wherein said collapse action is a gesture performed close to said selected group of graphic objects, said gesture having a predetermined shape.

5. The method as recited in claim 4 wherein said predetermined shape is a balloon shape.

6. The method as recited in claim 1 wherein said step of a user causing said group of graphic objects to be selected is further comprised of the steps of:

a1) drawing an enclosure graphic object about said group of graphic objects; and a2) selecting said enclosure graphic object.

7. The method as recited in claim 6 wherein said displaying substep causes said container icon to be displayed in the middle of an area defined by said enclosure graphical object.

8. The method as recited in claim 6 wherein said enclosure graphical object has a link.

9. The method as recited in claim 8 wherein said displaying substep causes said container icon to replace said link.

10. The method as recited in claim 1 wherein said step of a user causing said group of graphic objects to be selected is further comprised of the step of said user performing a free form selection about said group of graphic objects to be represented by a container icon.

11. The method as recited in claim 10 wherein said displaying substep causes said container icon to be displayed in the middle of an area defined by said freeform selection.

12. The method as recited in claim 1 wherein said step of a user causing said group of graphic objects to be selected is further comprised of the steps of performing a selection gesture operation on a subset of items in a list structure.

13. The method as recited in claim 12 wherein said step of said system collapsing said enclosure is further comprised of the substeps of adjusting the list structure as if said subset of list items had been removed and said display substep causes said container icon to be displayed at the end of the list item immediately preceding said subset of list items.

14. The method as recited in claim 1 further comprising the steps of:

d) said user performing an expand operation on said container icon to restore display of said group of graphic objects represented by said container icon; and e) said system expanding said container icon by performing the substeps of:

e1) retrieving said copy of said group of graphic objects to be represented by a container icon;

e2) removing the container icon from said display; and e3) displaying said group of graphic objects on said display at a position relative to the location of said container icon.

15. The method as recited in claim 14 wherein said group of graphic objects to be represented by a container icon are a subset of list items and said displaying substep operates as an insert operation into a list structure.

16. The method as recited in claim 14 wherein said displaying substep operates to overwrite graphic objects on said display.

17. The method as recited in claim 14 wherein said displaying substep operates to overlay graphic objects on said display.

18. A computer controlled graphics display system including a display for displaying graphic objects and input means for generating graphic objects and initiating user operations, said system further comprising:

selection means for detecting that a region has been selected by a user operation, said region containing a group of graphic objects;

collapsing means for detecting a user operation for removing said region containing a group of graphic objects from said display and replacing with a container icon; and expanding means for detecting a user operation for expanding a container icon back into a region containing an original group of graphic objects and causing said region containing an original group of graphic objects to replace said container icon on said display.

19. A method for representing a region on a workspace containing a group of graphic objects with a container icon on a graphics based computer system, said container icon acting as a reference to said region, said method comprising the steps of:

a) a user causing a region containing said group of graphic objects to be selected;

b) said user performing a collapse action on said selected region;

c) said system collapsing said selected region so that it is represented by said container icon by performing the substeps of:

c1) storing a copy of said region to be represented by a container icon;

c2) removing said region to be represented by a container icon from said display; and c3) displaying a container icon representing said selected region to be represented by a container icon.

20. The method as recited in claim 19 wherein said step of a user causing a region containing said group of graphic objects to be selected is further comprised of the steps of:

a1) said user drawing an enclosure graphic object around said group of graphic objects; and a2) said user selecting said enclosure graphic object.

* * * * *